United States Patent
Zhang et al.

(10) Patent No.: US 10,420,113 B2
(45) Date of Patent: Sep. 17, 2019

(54) RESOURCE RECONFIGURATION METHOD, BASE STATION, AND USER EQUIPMENT

(71) Applicant: Huawei Technologies Co., Ltd., Shenzhen, Guangdong (CN)

(72) Inventors: Tao Zhang, Beijing (CN); Bo Lin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/671,485

(22) Filed: Mar. 27, 2015

(65) Prior Publication Data
US 2015/0201418 A1  Jul. 16, 2015

Related U.S. Application Data

(63) Continuation of application No. PCT/CN2012/082314, filed on Sep. 28, 2012.

(51) Int. Cl.
*H04W 72/08* (2009.01)
*H04W 76/38* (2018.01)
(Continued)

(52) U.S. Cl.
CPC .......... *H04W 72/08* (2013.01); *H04L 5/0057* (2013.01); *H04W 24/04* (2013.01);
(Continued)

(58) Field of Classification Search
CPC ......... H04W 72/0406; H04W 72/0413; H04W 72/042; H04W 72/08; H04W 76/068; H04L 5/0057
(Continued)

(56) References Cited

U.S. PATENT DOCUMENTS 8,155,023 B2 * 4/2012 Vedantham ........... H04L 5/0037
370/252
8,619,747 B2 * 12/2013 Terry ................... H04L 1/1812
370/344
(Continued)

FOREIGN PATENT DOCUMENTS

CN  101835271 A  9/2010
CN  101932041 A  12/2010
(Continued)

OTHER PUBLICATIONS

"Access Alternatives for Handover", Alcatel, 3GPP TSG-RAN #56 WG 2 LTE, Oct. 6- Nov. 10, 2006, 5 pages.
(Continued)

*Primary Examiner* — Asad M Nawaz
*Assistant Examiner* — Saad A. Waqas
(74) *Attorney, Agent, or Firm* — Slater Matsil, LLP

(57) ABSTRACT

This application discloses a resource reconfiguration method, a base station, and a user equipment. The method includes: receiving, by a primary base station, a first message, where the first message is used to request to reconfigure, for a user equipment, a resource corresponding to a secondary base station; and initiating, by the primary base station, reconfiguration of the resource corresponding to the secondary base station for the user equipment. By means of this application, the resource corresponding to the secondary base station can be reconfigured for the user equipment in a case in which the secondary base station does not provide a reconfiguration function.

16 Claims, 7 Drawing Sheets

(51) Int. Cl.
*H04L 5/00* (2006.01)
*H04W 72/04* (2009.01)
*H04W 24/04* (2009.01)
*H04W 36/00* (2009.01)
*H04W 92/20* (2009.01)
*H04W 84/12* (2009.01)
*H04W 88/08* (2009.01)

(52) U.S. Cl.
CPC ..... *H04W 36/0072* (2013.01); *H04W 72/042* (2013.01); *H04W 72/0406* (2013.01); *H04W 72/0413* (2013.01); *H04W 76/38* (2018.02); *H04W 36/0069* (2018.08); *H04W 84/12* (2013.01); *H04W 88/08* (2013.01); *H04W 92/20* (2013.01)

(58) Field of Classification Search
USPC ......................................................... 370/329
See application file for complete search history.

(56) References Cited

U.S. PATENT DOCUMENTS

| | | | |
|---|---|---|---|
| 9,049,643 B2* | 6/2015 | Lee | H04W 76/15 |
| 2007/0293224 A1 | 12/2007 | Wang et al. | |
| 2008/0227454 A1 | 9/2008 | Damnjanovic | |
| 2008/0268850 A1* | 10/2008 | Narasimha | H04W 36/0072 455/437 |
| 2010/0118827 A1* | 5/2010 | Sundaresan | H04W 72/04 370/330 |
| 2013/0039231 A1* | 2/2013 | Wang | H04W 72/10 370/280 |
| 2013/0301439 A1* | 11/2013 | Heo | H04W 4/90 370/252 |
| 2014/0016623 A1* | 1/2014 | Bai | H04L 5/001 370/336 |
| 2014/0056251 A1 | 2/2014 | Ahn et al. | |
| 2014/0161086 A1 | 6/2014 | Tamura et al. | |
| 2015/0230235 A1 | 8/2015 | Uchino et al. | |
| 2015/0304891 A1* | 10/2015 | Dinan | H04W 76/27 370/331 |
| 2015/0319653 A1 | 11/2015 | Wang et al. | |

FOREIGN PATENT DOCUMENTS

| | | |
|---|---|---|
| CN | 102378198 A | 3/2012 |
| EP | 2 143 294 A2 | 1/2010 |
| EP | 2 874 460 A1 | 5/2015 |
| EP | 2 882 238 A1 | 6/2015 |
| JP | 2012195289 A | 10/2012 |
| JP | 2014-053683 A | 3/2014 |
| JP | 2014-513505 A | 5/2014 |
| JP | WO2013/179509 A1 | 1/2016 |
| RU | 2407228 C2 | 12/2010 |
| WO | WO 2007/149509 A2 | 12/2007 |
| WO | WO 2009/045026 A2 | 4/2009 |
| WO | WO 2013/043027 A1 | 3/2013 |

OTHER PUBLICATIONS

"Implicit reconfiguration and delta signaling", Panasonic, 3GPP TSG RAN WG2 #65bis meeting, Mar. 23-27, 2009, 3 pages.
"RACH-less handover in CoMP", Huawei, 3GPP TSG RAN WG2 Meeting #67, Aug. 24-28, 2009, 2 pages.
"Release of PUCCH resources and removal of SCell Configuration", InterDigital Communications, 3GPP TSG-RAN WG2 #71, Aug. 23-27, 2010, 11 pages.
"CC linkage of RA on SCell", CATT, 3GPP TSG RAN WG2 Meeting #75, Aug. 22-26, 2011, 4 pages, R2-113822.
"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.0.0, Sep. 2012, 55 pages.
"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0, Sep. 2012, 325 pages.
"3rd Generation Partnership Project; Technical Specification Group Radio Access Network; Evolved Universal Terrestrial Radio Access Network (E-UTRAN); X2 application protocol (X2AP)(Release 11)", 3GPP TS 36.423 V11.2.0, Sep. 2012, 136 pages.

* cited by examiner

RESOURCE RECONFIGURATION METHOD, BASE STATION, AND USER EQUIPMENT

CROSS-REFERENCE TO RELATED APPLICATIONS

This application is a continuation of International Application No. PCT/CN2012/082314, filed on Sep. 28, 2012, which is hereby incorporated by reference in its entirety.

TECHNICAL FIELD

This application relates to the communications field, and in particular, to a resource reconfiguration method, a base station, and a user equipment.

BACKGROUND

If a user equipment (UE for short) needs to perform uplink communication with a cell of a base station, the UE needs to obtain a timing advance (TA) of the cell. A TA from a specific UE to a specific cell changes along with changes of factors such as a location of the UE; therefore, each time after obtaining a latest TA from a base station, the UE starts or restarts a timing advance timer (TAT). When the TAT times out, the UE deems that a previously obtained TA is no longer valid; therefore, uplink resource configuration is released, and all uplink transmission except a random access request is terminated, so as to avoid unnecessary uplink interference. If TAs from the UE to multiple cells are the same, the multiple cells belong to a same TA group. Cells belonging to a same TA group share a same TAT. Corresponding to a TAT maintained by the UE, the base station also maintains a timer. Each time after sending a latest TA to the UE, the base station also correspondingly starts or restarts the timer maintained by the base station; therefore, the base station can infer, by using a state of the timer maintained by the base station, a state of the corresponding TAT maintained by the UE.

If the UE needs to send new uplink data to the base station, the UE sends a scheduling request (SR) to a specific cell of the base station to request an uplink resource. If the base station does not respond to the SR, the UE may repeatedly send the SR, but the maximum number of repetition times cannot be exceeded. If the number of times the UE sends the SR reaches the maximum number of repetition times, the UE deems that an SR failure occurs. If the UE detects an SR failure, the UE releases uplink resource configuration, and initiates a random access request to the base station.

A physical uplink control channel (PUCCH) resource is also required for the UE to send the SR. In most cases, the base station configures and sends to the UE in advance, a PUCCH resource for sending an SR. However, because the PUCCH resource is relatively scarce, depending on conditions such as an uplink service of the UE, the base station may also not allocate in advance, to the UE, the PUCCH resource for sending an SR.

After uplink data arrives in the UE but the UE detects that a TAT times out, or detects that an SR failure occurs, or detects that no PUCCH resource is available for sending an SR, the UE initiates a contention-based random access process to the base station. In this process, the UE obtains an updated TA and an uplink grant (UL Grant), where the uplink grant corresponds to an allocated uplink resource. The UE may send the uplink data or control information such as a buffer status report (BSR for short) by using the uplink resource. Then, the base station may send a reconfiguration message to the UE, where the message includes uplink resource configuration, and the uplink resource configuration specifically includes at least one type of the following configuration: scheduling request (SR) configuration, sounding (Sounding) reference signal configuration, and channel quality indicator (CQI) reporting configuration. The UE sends an SR, a Sounding, and a CQI to the base station according to the uplink resource configuration. In a new type of network deployment, a UE can simultaneously communicate with more than two base stations, where one base station may be referred to as a primary base station, another base station may be referred to as a secondary base station, and the primary base station and the secondary base station are connected.

If the UE detects that a TAT of the secondary base station times out, or an SR failure of the UE occurs in the secondary base station, or the UE has no PUCCH resource for sending an SR to the secondary base station, according to the prior art, the UE can initiate a contention-based random access process only to the secondary base station, and then the secondary base station may send a reconfiguration message to the UE. However, a secondary base station in the prior art may not provide a reconfiguration function, thereby resulting in a failed reconfiguration process.

In addition, the contention-based random access process used by the UE has a relatively long delay, and easily fails because of collision, thereby delaying sending of uplink data, and impeding user experience.

SUMMARY

In view of this, this application provides a resource reconfiguration method, a base station, and a user equipment, so as to solve a problem in the prior art that a user equipment cannot be reconfigured in a secondary base station when the secondary base station does not provide a reconfiguration function.

According to a first aspect, a resource reconfiguration method is provided, including: receiving, by a primary base station, a first message, where the first message is used to request to reconfigure, for a user equipment, a resource corresponding to a secondary base station; and initiating, by the primary base station, reconfiguration of the resource corresponding to the secondary base station for the user equipment.

In any one of the foregoing optional implementation manners, the receiving, by a primary base station, a first message includes: receiving, by the primary base station, the first message from the user equipment; and the initiating, by the primary base station, reconfiguration of the resource corresponding to the secondary base station for the user equipment includes: sending, by the primary base station, resource reconfiguration information to the user equipment, where the resource reconfiguration information is information about the resource that is reconfigured for the user equipment and corresponding to the secondary base station.

In any one of the foregoing optional implementation manners, the resource reconfiguration information includes: a preamble sequence number and a physical random access channel sequence number that are allocated to the user equipment and corresponding to the secondary base station; and the sending, by the primary base station, resource reconfiguration information to the user equipment includes: sending, by the primary base station, the preamble sequence number and the physical random access channel sequence number to the user equipment, so that the user equipment sends a random access request message to the secondary base station according to the preamble sequence number and the physical random access channel sequence number.

In any one of the foregoing optional implementation manners, the resource reconfiguration information includes: timing advance information and/or an uplink grant, for the user equipment, corresponding to the secondary base station; and the sending, by the primary base station, resource reconfiguration information to the user equipment includes: sending, by the primary base station, the timing advance information and/or the uplink grant to the user equipment.

In any one of the foregoing optional implementation manners, before the sending, by the primary base station, resource reconfiguration information to the user equipment, the primary base station determines the resource reconfiguration information for the user equipment.

In any one of the foregoing optional implementation manners, the receiving, by a primary base station, a first message includes: receiving, by the primary base station, the first message from the user equipment; and the initiating, by the primary base station, reconfiguration of the resource corresponding to the secondary base station for the user equipment includes: sending, by the primary base station, a second message to the secondary base station, so that the secondary base station sends resource reconfiguration information corresponding to the secondary base station to the user equipment.

In any one of the foregoing optional implementation manners, the sending, by the primary base station, a second message to the secondary base station, where the second message is used to trigger the secondary base station to send resource reconfiguration information corresponding to the secondary base station to the user equipment includes: sending, by the primary base station, the second message to the secondary base station, where the second message is used to request the secondary base station to allocate a preamble sequence number and a physical random access channel sequence number to the user equipment, and send the preamble sequence number and the physical random access channel sequence number to the user equipment, so that the user equipment sends a random access request message to the secondary base station according to the preamble sequence number and the physical random access channel sequence number.

In any one of the foregoing optional implementation manners, the sending, by the primary base station, a second message to the secondary base station, where the second message is used to trigger the secondary base station to send resource reconfiguration information corresponding to the secondary base station to the user equipment includes: sending, by the primary base station, the second message to the secondary base station, where the second message is used to request the secondary base station to send a third message to the user equipment, where the third message includes timing advance information and/or an uplink grant, for the user equipment, corresponding to the secondary base station.

In any one of the foregoing optional implementation manners, the second message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the receiving, by a primary base station, a first message includes: receiving, by the primary base station, the first message sent by the secondary base station.

In any one of the foregoing optional implementation manners, the first message is sent after the secondary base station receives a random access request message sent by the user equipment; or the first message is sent after the secondary base station detects that a timing advance timer TAT, of the user equipment, corresponding to the secondary base station times out.

In any one of the foregoing optional implementation manners, the primary base station receives uplink resource configuration information that is sent by the secondary base station, configured for the user equipment, and corresponding to the secondary base station; and the initiating, by the primary base station, reconfiguration of the resource corresponding to the secondary base station for the user equipment includes: sending, by the primary base station, the uplink resource configuration information to the user equipment.

In any one of the foregoing optional implementation manners, the initiating, by the primary base station, reconfiguration of the resource corresponding to the secondary base station for the user equipment includes: sending, by the primary base station to the user equipment, uplink resource configuration information corresponding to the secondary base station.

In any one of the foregoing optional implementation manners, the uplink resource configuration information includes at least one of the following: scheduling request configuration information, sounding reference signal configuration information, and channel quality indicator reporting configuration information.

In any one of the foregoing optional implementation manners, the first message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

According to a second aspect, a resource reconfiguration method is provided, including: determining, by a user equipment, that a resource corresponding to a secondary base station needs to be reconfigured; and sending, by the user equipment, a first message to a primary base station, so that the primary base station initiates reconfiguration of the resource corresponding to the secondary base station for the user equipment.

In any one of the foregoing optional implementation manners, after the sending, by the user equipment, a first message to a primary base station, the user equipment receives resource reconfiguration information sent by the primary base station, where the resource reconfiguration information is information about the resource that is reconfigured for the user equipment and corresponding to the secondary base station.

In any one of the foregoing optional implementation manners, the resource reconfiguration information includes: a preamble sequence number and a physical random access channel sequence number that are allocated to the user equipment and corresponding to the secondary base station; and after receiving the resource reconfiguration information sent by the primary base station, the user equipment sends a random access request message to the secondary base station according to the preamble sequence number and the physical random access channel sequence number.

In any one of the foregoing optional implementation manners, the resource reconfiguration information includes: timing advance information and/or an uplink grant, for the user equipment, corresponding to the secondary base station; and after receiving the resource reconfiguration information sent by the primary base station, the user equipment sends an uplink signal to the secondary base station by using the timing advance information and/or the uplink grant.

In any one of the foregoing optional implementation manners, the resource reconfiguration information is determined by the primary base station for the user equipment.

In any one of the foregoing optional implementation manners, after the sending, by the user equipment, a first message to a primary base station, the user equipment receives resource reconfiguration information that is sent by the secondary base station and corresponding to the secondary base station, where the resource reconfiguration information is sent after the secondary base station receives a second message sent by the primary base station.

In any one of the foregoing optional implementation manners, the resource reconfiguration information includes: a preamble sequence number and a physical random access channel sequence number that are allocated to the user equipment and corresponding to the secondary base station; and after receiving the resource reconfiguration information sent by the secondary base station, the user equipment sends a random access request message to the secondary base station according to the preamble sequence number and the physical random access channel sequence number.

In any one of the foregoing optional implementation manners, the resource reconfiguration information includes: timing advance information and/or an uplink grant, for the user equipment, corresponding to the secondary base station; and after receiving the resource reconfiguration information sent by the secondary base station, the user equipment sends an uplink signal to the secondary base station by using the timing advance information and/or the uplink grant.

In any one of the foregoing optional implementation manners, the second message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, after the sending, by the user equipment, a first message to a primary base station, the user equipment receives uplink resource configuration information that is sent by the primary base station and corresponding to the secondary base station.

In any one of the foregoing optional implementation manners, the uplink resource configuration information includes at least one of the following: scheduling request configuration information, sounding reference signal configuration information, and channel quality indicator reporting configuration information.

In any one of the foregoing optional implementation manners, the first message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

According to a third aspect, a resource reconfiguration method is provided, including: determining, by a secondary base station, that a resource corresponding to the secondary base station needs to be reconfigured for a user equipment; and sending, by the secondary base station, a first message to a primary base station, so that the primary base station initiates reconfiguration of the resource corresponding to the secondary base station for the user equipment.

In any one of the foregoing optional implementation manners, the determining, by a secondary base station, that a resource corresponding to the secondary base station needs to be reconfigured for a user equipment includes: when receiving a random access request message sent by the user equipment, determining, by the secondary base station, reconfiguration of the resource corresponding to the secondary base station for the user equipment; or when detecting that a timing advance timer TAT, of the user equipment, corresponding to the secondary base station times out, determining, by the secondary base station, reconfiguration of the resource corresponding to the secondary base station for the user equipment.

In any one of the foregoing optional implementation manners, after the determining, by a secondary base station, that a resource corresponding to the secondary base station needs to be reconfigured for a user equipment, the secondary base station sends, to the primary base station, uplink resource configuration information that is configured for the user equipment and corresponding to the secondary base station, so that the primary base station sends the uplink resource configuration information to the user equipment.

In any one of the foregoing optional implementation manners, the uplink resource configuration information includes at least one of the following: scheduling request configuration information, sounding reference signal configuration information, and channel quality indicator reporting configuration information.

In any one of the foregoing optional implementation manners, the first message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the reason for requesting reconfiguration is used to indicate one piece of the following information: a TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

According to a fourth aspect, a base station is provided, where the base station is used as a primary base station, and the base station includes: a receiving unit, configured to receive a first message, where the first message is used to request to reconfigure, for a user equipment, a resource corresponding to a secondary base station; and an initiating unit, configured to initiate reconfiguration of the resource corresponding to the secondary base station for the user equipment.

In any one of the foregoing optional implementation manners, the receiving unit is configured to receive the first message from the user equipment; and the primary base station further includes a sending unit, and the initiating unit is configured to control the sending unit to send resource reconfiguration information to the user equipment, where the resource reconfiguration information is information about the resource that is reconfigured for the user equipment and corresponding to the secondary base station.

In any one of the foregoing optional implementation manners, the resource reconfiguration information includes: a preamble sequence number and a physical random access channel sequence number that are allocated to the user equipment and corresponding to the secondary base station; and the initiating unit is configured to control the sending unit to send the preamble sequence number and the physical random access channel sequence number to the user equipment, so that the user equipment sends a random access request message to the secondary base station according to the preamble sequence number and the physical random access channel sequence number.

In any one of the foregoing optional implementation manners, the resource reconfiguration information includes: timing advance information and/or an uplink grant, for the user equipment, corresponding to the secondary base station; and the initiating unit is configured to control the sending unit to send the timing advance information and/or the uplink grant to the user equipment.

In any one of the foregoing optional implementation manners, the primary base station further includes a determining unit, configured to determine the resource reconfiguration information for the user equipment before the primary base station sends the resource reconfiguration information to the user equipment.

In any one of the foregoing optional implementation manners, the receiving unit is configured to receive the first message from the user equipment; and the primary base station further includes a sending unit, and the initiating unit is configured to control the sending unit to send a second message to the secondary base station, so that the secondary base station sends resource reconfiguration information corresponding to the secondary base station to the user equipment.

In any one of the foregoing optional implementation manners, the initiating unit is configured to control the sending unit to send the second message to the secondary base station, where the second message is used to request the secondary base station to allocate a preamble sequence number and a physical random access channel sequence number to the user equipment, and send the preamble sequence number and the physical random access channel sequence number to the user equipment, so that the user equipment sends a random access request message to the secondary base station according to the preamble sequence number and the physical random access channel sequence number.

In any one of the foregoing optional implementation manners, the initiating unit is configured to control the sending unit to send the second message to the secondary base station, where the second message is used to request the secondary base station to send a third message to the user equipment, where the third message includes timing advance information and/or an uplink grant, for the user equipment, corresponding to the secondary base station.

In any one of the foregoing optional implementation manners, the second message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the receiving unit is configured to receive the first message sent by the secondary base station.

In any one of the foregoing optional implementation manners, the first message is sent after the secondary base station receives a random access request message sent by the user equipment; or the first message is sent after the secondary base station detects that a timing advance timer TAT, of the user equipment, corresponding to the secondary base station times out.

In any one of the foregoing optional implementation manners, the receiving unit is further configured to receive uplink resource configuration information that is sent by the secondary base station, configured for the user equipment, and corresponding to the secondary base station; and the primary base station further includes a sending unit, and the initiating unit is configured to control the sending unit to send the uplink resource configuration information to the user equipment.

In any one of the foregoing optional implementation manners, the primary base station further includes a sending unit, and the initiating unit is configured to control the sending unit to send uplink resource configuration information corresponding to the secondary base station to the user equipment.

In any one of the foregoing optional implementation manners, the uplink resource configuration information includes at least one of the following: scheduling request configuration information, sounding reference signal configuration information, and channel quality indicator reporting configuration information.

In any one of the foregoing optional implementation manners, the first message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

According to a fifth aspect, a user equipment is provided, including: a determining unit, configured to determine that a resource corresponding to a secondary base station needs to be reconfigured; and a sending unit, configured to send a first message to a primary base station, so that the primary base station initiates reconfiguration of the resource corresponding to the secondary base station for the user equipment.

In any one of the foregoing optional implementation manners, the user equipment further includes a receiving unit, configured to: after the first message is sent to the primary base station, receive resource reconfiguration information sent by the primary base station, where the resource reconfiguration information is information about the resource that is reconfigured for the user equipment and corresponding to the secondary base station.

In any one of the foregoing optional implementation manners, the resource reconfiguration information includes: a preamble sequence number and a physical random access channel sequence number that are allocated to the user equipment and corresponding to the secondary base station; and the sending unit is further configured to: after the resource reconfiguration information sent by the primary base station is received, send a random access request message to the secondary base station according to the preamble sequence number and the physical random access channel sequence number.

In any one of the foregoing optional implementation manners, the resource reconfiguration information includes: timing advance information and/or an uplink grant, for the user equipment, corresponding to the secondary base station; and the sending unit is further configured to: after the resource reconfiguration information sent by the primary base station is received, send an uplink signal to the secondary base station by using the timing advance information and/or the uplink grant.

In any one of the foregoing optional implementation manners, the resource reconfiguration information is determined by the primary base station for the user equipment.

In any one of the foregoing optional implementation manners, the user equipment further includes a receiving unit, configured to: after the user equipment sends the first message to the primary base station, receive resource reconfiguration information that is sent by the secondary base station and corresponding to the secondary base station, where the resource reconfiguration information is sent after the secondary base station receives a second message sent by the primary base station.

In any one of the foregoing optional implementation manners, the resource reconfiguration information includes: a preamble sequence number and a physical random access channel sequence number that are allocated to the user equipment and corresponding to the secondary base station; and the sending unit is configured to: after the resource reconfiguration information sent by the secondary base station is received, send a random access request message to the secondary base station according to the preamble sequence number and the physical random access channel sequence number.

In any one of the foregoing optional implementation manners, the resource reconfiguration information includes: timing advance information and/or an uplink grant, for the user equipment, corresponding to the secondary base station; and the sending unit is configured to: after the resource reconfiguration information sent by the secondary base station is received, send an uplink signal to the secondary base station by using the timing advance information and/or the uplink grant.

In any one of the foregoing optional implementation manners, the second message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the user equipment further includes a receiving unit, configured to: after the user equipment sends the first message to the primary base station, receive uplink resource configuration information that is sent by the primary base station and corresponding to the secondary base station.

In any one of the foregoing optional implementation manners, the uplink resource configuration information includes at least one of the following: scheduling request configuration information, sounding reference signal configuration information, and channel quality indicator reporting configuration information.

In any one of the foregoing optional implementation manners, the first message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

According to a sixth aspect, a base station is provided, where the base station may be used as a secondary base station, and the base station includes: a determining unit, configured to determine that a resource corresponding to the secondary base station needs to be reconfigured for a user equipment; and a sending unit, configured to send a first message to a primary base station, so that the primary base station initiates reconfiguration of the resource corresponding to the secondary base station for the user equipment.

In any one of the foregoing optional implementation manners, the secondary base station includes: a receiving unit, and in a case in which the receiving unit receives a random access request message sent by the user equipment, the determining unit determines reconfiguration of the resource corresponding to the secondary base station for the user equipment, or in a case in which it is detected that a timing advance timer TAT, of the user equipment, corresponding to the secondary base station times out, the determining unit determines reconfiguration of the resource corresponding to the secondary base station for the user equipment.

In any one of the foregoing optional implementation manners, the sending unit is configured to: after it is determined that the resource corresponding to the secondary base station needs to be reconfigured for the user equipment, send, to the primary base station, uplink resource configuration information that is configured for the user equipment and corresponding to the secondary base station, so that the primary base station sends the uplink resource configuration information to the user equipment.

In any one of the foregoing optional implementation manners, the uplink resource configuration information includes at least one of the following: scheduling request configuration information, sounding reference signal configuration information, and channel quality indicator reporting configuration information.

In any one of the foregoing optional implementation manners, the first message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the reason for requesting reconfiguration is used to indicate one piece of the following information: a TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

According to a seventh aspect, a base station is provided, where the base station is used as a primary base station, and the base station includes: a transceiver, configured to receive and transmit a signal; and a processor, configured to perform the following steps: controlling the transceiver to receive a first message, where the first message is used to request to reconfigure, for a user equipment, a resource corresponding to a secondary base station; and initiating reconfiguration of the resource corresponding to the secondary base station for the user equipment.

In any one of the foregoing optional implementation manners, the processor controls, in the following manner, the transceiver to receive the first message: controlling the transceiver to receive the first message from the user equipment; and the processor initiates reconfiguration of the resource corresponding to the secondary base station for the user equipment in the following manner: controlling the transceiver to send resource reconfiguration information to the user equipment, where the resource reconfiguration information is information about the resource that is reconfigured for the user equipment and corresponding to the secondary base station.

In any one of the foregoing optional implementation manners, the resource reconfiguration information includes: a preamble sequence number and a physical random access channel sequence number that are allocated to the user equipment and corresponding to the secondary base station; and the processor controls, in the following manner, the transceiver to send the resource reconfiguration information to the user equipment: controlling the transceiver to send the preamble sequence number and the physical random access channel sequence number to the user equipment, so that the user equipment sends a random access request message to the secondary base station according to the preamble sequence number and the physical random access channel sequence number.

In any one of the foregoing optional implementation manners, the resource reconfiguration information includes: timing advance information and/or an uplink grant, for the user equipment, corresponding to the secondary base station; and the processor controls, in the following manner, the transceiver to send the resource reconfiguration information to the user equipment: controlling the transceiver to send the timing advance information and/or the uplink grant to the user equipment.

In any one of the foregoing optional implementation manners, the processor determines the resource reconfiguration information for the user equipment before the resource reconfiguration information is sent to the user equipment.

In any one of the foregoing optional implementation manners, the processor controls, in the following manner, the transceiver to receive the first message: controlling the transceiver to receive the first message from the user equipment; and the processor initiates reconfiguration of the resource corresponding to the secondary base station for the user equipment in the following manner: controlling the transceiver to send a second message to the secondary base station, so that the secondary base station sends resource reconfiguration information corresponding to the secondary base station to the user equipment.

In any one of the foregoing optional implementation manners, the processor controls, the transceiver to send the second message to the secondary base station, where the second message is used to trigger the secondary base station to send the resource reconfiguration information corresponding to the secondary base station to the user equipment: the processor controls, the transceiver to send the second message to the secondary base station, where the second message is used to request the secondary base station to allocate a preamble sequence number and a physical random access channel sequence number to the user equipment, and send the preamble sequence number and the physical random access channel sequence number to the user equipment, so that the user equipment sends a random access request message to the secondary base station according to the preamble sequence number and the physical random access channel sequence number.

In any one of the foregoing optional implementation manners, the processor controls, the transceiver to send the second message to the secondary base station, where the second message is used to trigger the secondary base station to send the resource reconfiguration information corresponding to the secondary base station to the user equipment includes: controlling the transceiver to send the second message to the secondary base station, where the second message is used to request the secondary base station to send a third message to the user equipment, where the third message includes timing advance information and/or an uplink grant, for the user equipment, corresponding to the secondary base station.

In any one of the foregoing optional implementation manners, the second message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the processor controls, in the following manner, the transceiver to receive the first message: controlling the transceiver to receive the first message sent by the secondary base station.

In any one of the foregoing optional implementation manners, the first message is sent after the secondary base station receives a random access request message sent by the user equipment; or the first message is sent after the secondary base station detects that a timing advance timer TAT, of the user equipment, corresponding to the secondary base station times out.

In any one of the foregoing optional implementation manners, the processor controls the transceiver to receive uplink resource configuration information that is sent by the secondary base station, configured for the user equipment, and corresponding to the secondary base station; and the processor initiates reconfiguration of the resource corresponding to the secondary base station for the user equipment in the following manner: controlling the transceiver to send the uplink resource configuration information to the user equipment.

In any one of the foregoing optional implementation manners, the processor initiates reconfiguration of the resource corresponding to the secondary base station for the user equipment in the following manner: controlling the transceiver to send, to the user equipment, uplink resource configuration information corresponding to the secondary base station.

In any one of the foregoing optional implementation manners, the uplink resource configuration information includes at least one of the following: scheduling request configuration information, sounding reference signal configuration information, and channel quality indicator reporting configuration information.

In any one of the foregoing optional implementation manners, the first message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

According to an eighth aspect, a user equipment is provided, including: a transceiver, configured to receive and transmit a signal; and a processor, configured to perform the following steps: determining that a resource corresponding to a secondary base station needs to be reconfigured; and controlling the transceiver to send a first message to a primary base station, so that the primary base station initiates reconfiguration of the resource corresponding to the secondary base station for the user equipment.

In any one of the foregoing optional implementation manners, after the user equipment sends the first message to the primary base station, the processor controls the transceiver to receive resource reconfiguration information sent by the primary base station, where the resource reconfiguration information is information about the resource that is reconfigured for the user equipment and corresponding to the secondary base station.

In any one of the foregoing optional implementation manners, the resource reconfiguration information includes: a preamble sequence number and a physical random access channel sequence number that are allocated to the user equipment and corresponding to the secondary base station; and after the resource reconfiguration information sent by the primary base station is received, the processor controls the transceiver to send a random access request message to the secondary base station according to the preamble sequence number and the physical random access channel sequence number.

In any one of the foregoing optional implementation manners, the resource reconfiguration information includes: timing advance information and/or an uplink grant, for the user equipment, corresponding to the secondary base station; and after the resource reconfiguration information sent by the primary base station is received, the processor controls the transceiver to send an uplink signal to the secondary base station by using the timing advance information and/or the uplink grant.

In any one of the foregoing optional implementation manners, the resource reconfiguration information is determined by the primary base station for the user equipment.

In any one of the foregoing optional implementation manners, after the first message is sent to the primary base station, the processor controls the transceiver to receive resource reconfiguration information that is sent by the secondary base station and corresponding to the secondary base station, where the resource reconfiguration information is sent after the secondary base station receives a second message sent by the primary base station.

In any one of the foregoing optional implementation manners, the resource reconfiguration information includes: a preamble sequence number and a physical random access channel sequence number that are allocated to the user equipment and corresponding to the secondary base station; and after the resource reconfiguration information sent by the secondary base station is received, the processor controls the transceiver to send a random access request message to the secondary base station according to the preamble sequence number and the physical random access channel sequence number.

In any one of the foregoing optional implementation manners, the resource reconfiguration information includes: timing advance information and/or an uplink grant, for the user equipment, corresponding to the secondary base station; and after the resource reconfiguration information sent by the secondary base station is received, the processor controls the transceiver to send an uplink signal to the secondary base station by using the timing advance information and/or the uplink grant.

In any one of the foregoing optional implementation manners, the second message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, after the first message' is sent to the primary base station, the processor controls the transceiver to receive uplink resource configuration information that is sent by the primary base station and corresponding to the secondary base station.

In any one of the foregoing optional implementation manners, the uplink resource configuration information includes at least one of the following: scheduling request configuration information, sounding reference signal configuration information, and channel quality indicator reporting configuration information.

In any one of the foregoing optional implementation manners, the first message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

According to a ninth aspect, a base station is provided, where the base station is used as a secondary base station, and the base station includes: a transceiver, configured to receive and transmit a signal; and a processor, configured to perform the following steps: determining that a resource corresponding to the secondary base station needs to be reconfigured for a user equipment; and controlling the transceiver to send a first message to a primary base station, so that the primary base station initiates reconfiguration of the resource corresponding to the secondary base station for the user equipment.

In any one of the foregoing optional implementation manners, the processor determines, in the following manner, that the resource corresponding to the secondary base station needs to be reconfigured for the user equipment: if the transceiver receives a random access request message sent by the user equipment, the processor determines reconfiguration of the resource corresponding to the secondary base station for the user equipment; or if the processor detects that a timing advance timer TAT, of the user equipment, corresponding to the secondary base station times out, the processor determines reconfiguration of the resource corresponding to the secondary base station for the user equipment.

In any one of the foregoing optional implementation manners, after determining that the resource corresponding to the secondary base station needs to be reconfigured for the user equipment, the processor controls the transceiver to send, to the primary base station, uplink resource configuration information that is configured for the user equipment and corresponding to the secondary base station, so that the primary base station sends the uplink resource configuration information to the user equipment.

In any one of the foregoing optional implementation manners, the uplink resource configuration information includes at least one of the following: scheduling request configuration information, sounding reference signal configuration information, and channel quality indicator reporting configuration information.

In any one of the foregoing optional implementation manners, the first message includes at least one piece of the following information: an identifier of the user equipment, a cell identifier of the secondary base station which is requested by the user equipment to be reconfigured resource, and a reason for requesting reconfiguration.

In any one of the foregoing optional implementation manners, the reason for requesting reconfiguration is used to indicate one piece of the following information: a TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

By using the foregoing solutions, a primary base station receives a first message used to request to reconfigure, for a user equipment, a resource corresponding to a secondary base station; and initiates reconfiguration of the resource corresponding to the secondary base station for the user equipment. In this way, when the secondary base station does not provide a reconfiguration function, the resource corresponding to the secondary base station can be reconfigured for the user equipment.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A user equipment may also be a mobile terminal (MT for short), a mobile user equipment, and the like, and may communicate with one or more core networks through a radio access network (RAN for short). The user equipment may be a mobile terminal, such as a mobile phone (also referred to as a "cellular" phone) or a computer with a mobile terminal. For example, the user equipment may be a portable, pocket-sized, handheld, computer built-in, or in-vehicle mobile apparatus. In this application, the user equipment supports a WiFi function.

A base station may be a base station (BTS for short) in GSM or CDMA, may also be a base station (NodeB) in WCDMA, and may further be an evolved node B (eNB for short) in LTE, which is not limited herein. A secondary base station in the embodiments of the present invention may also be a wireless fidelity (WiFi for short) access point (AP for short), and may also be a user equipment that can implement some functions of a base station.

Figure 1:
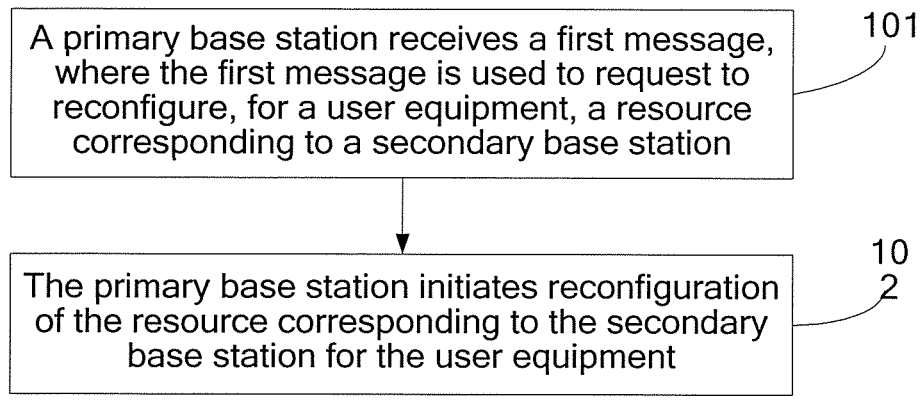
FIG. 1 is a flowchart of a resource reconfiguration method according to an embodiment of the present invention.

FIG. 1 is a flowchart of a resource reconfiguration method according to an embodiment of the present invention. As shown in FIG. 1, the method includes:

Step 101: A primary base station receives a first message, where the first message is used to request to reconfigure, for a user equipment, a resource corresponding to a secondary base station.

Step 102: The primary base station initiates reconfiguration of the resource corresponding to the secondary base station for the user equipment.

In actual network deployment in the prior art, a case in which only a primary base station provides a reconfiguration function exists, and a secondary base station may not provide the reconfiguration function. By using this embodiment, the primary base station initiates reconfiguration of the resource corresponding to the secondary base station for the user equipment after receiving the first message so that the resource corresponding to the secondary base station can be reconfigured for the user equipment in a case in which the secondary base station does not provide the reconfiguration function.

Optionally, the receiving, by a primary base station, a first message includes: receiving, by the primary base station, the first message from the user equipment; and the initiating, by the primary base station, reconfiguration of the resource corresponding to the secondary base station for the user equipment includes: sending, by the primary base station, resource reconfiguration information to the user equipment, where the resource reconfiguration information is information about the resource that is reconfigured for the user equipment and corresponding to the secondary base station. By using this embodiment, the primary base station reconfigures the resource corresponding to the secondary base station for the user equipment.

Preferably, the resource reconfiguration information includes: a preamble sequence number and a physical random access channel sequence number that are allocated to the user equipment and corresponding to the secondary base station. The primary base station sends the preamble sequence number and the physical random access channel sequence number to the user equipment, and the user equipment sends a random access request message to the secondary base station according to the preamble sequence number and the physical random access channel sequence number.

In the prior art, a contention-based random access process is used during reconfiguration. This process has a relatively long delay, and easily fails because of collision, thereby delaying sending of uplink data, and impeding user experience. By using this embodiment, the primary base station sends the preamble sequence number and the physical random access channel sequence number to the user equipment, so that the user equipment can access the secondary base station in a non-contention based random access manner. In this way, an access delay is reduced, and uplink data can be quickly sent to the secondary base station, thereby improving user experience.

Preferably, the resource reconfiguration information includes: timing advance information and/or an uplink grant, for the user equipment, corresponding to the secondary base station; and the sending, by the primary base station, resource reconfiguration information to the user equipment includes: sending, by the primary base station, the timing advance information and/or the uplink grant to the user equipment. By using this embodiment, the primary base station directly sends the timing advance information and/or the uplink grant to the user equipment, and the user equipment does not need to obtain the timing advance information by means of a random access process. In this way, a delay is reduced, and uplink data can be quickly sent to the secondary base station, thereby improving user experience.

Optionally, before the sending, by the primary base station, resource reconfiguration information to the user equipment, the primary base station determines the foregoing resource reconfiguration information for the user equipment.

Preferably, the receiving, by a primary base station, a first message includes: receiving, by the primary base station, the first message from the user equipment; and the initiating, by the primary base station, reconfiguration of the resource corresponding to the secondary base station for the user equipment includes: sending, by the primary base station, a second message to the secondary base station, so that the secondary base station sends resource reconfiguration information corresponding to the secondary base station to the user equipment.

Optionally, the primary base station sends the second message to the secondary base station to request the secondary base station to allocate a preamble sequence number and a physical random access channel sequence number to the user equipment, and send the preamble sequence number and the physical random access channel sequence number to the user equipment; and then the user equipment may send a random access request message to the secondary base station according to the preamble sequence number and the physical random access channel sequence number.

In the prior art, a contention-based random access process is used during reconfiguration. This process has a relatively long delay, and easily fails because of collision, thereby delaying sending of uplink data and impeding user experience. By using this embodiment, the primary base station sends the preamble sequence number and the physical random access channel sequence number to the user equipment, so that the user equipment can access the secondary base station in a non-contention based random access manner. In this way, an access delay is reduced, and uplink data can be quickly sent to the secondary base station, thereby improving user experience.

Preferably, the primary base station sends the second message to the secondary base station, where the second message is used to request the secondary base station to send a third message to the user equipment, where the third message includes timing advance information and/or an uplink grant, for the user equipment, corresponding to the secondary base station. By using this embodiment, the secondary base station directly sends the timing advance information and/or the uplink grant to the user equipment, and the user equipment does not need to obtain the timing advance information by means of a random access process. In this way, a delay is reduced, and uplink data can be quickly sent to the secondary base station, thereby improving user experience.

Optionally, the second message includes at least one piece of the following information: an identifier of the user equipment, a cell identifier of the secondary base station which is requested by the user equipment to be reconfigured resource, and a reason for requesting reconfiguration.

Preferably, the receiving, by a primary base station, a first message includes: receiving, by the primary base station, the first message sent by the secondary base station.

Optionally, the first message is sent after the secondary base station receives a random access request message sent by the user equipment, or the first message is sent after the secondary base station detects that a TAT, of the user equipment, corresponding to the secondary base station times out.

Optionally, the primary base station receives uplink resource configuration information that is sent by the secondary base station, configured for the user equipment, and corresponding to the secondary base station; and the initiating, by the primary base station, reconfiguration of the resource corresponding to the secondary base station for the user equipment includes: sending, by the primary base station, the received uplink resource configuration information to the user equipment.

Preferably, the initiating, by the primary base station, reconfiguration of the resource corresponding to the secondary base station for the user equipment includes: sending, by the primary base station to the user equipment, uplink resource configuration information corresponding to the secondary base station.

Optionally, the uplink resource configuration information includes at least one of the following: scheduling request configuration information, sounding reference signal configuration information, and channel quality indicator reporting configuration information.

Preferably, the first message includes at least one piece of the following information: an identifier of the user equipment, a cell identifier of the secondary base station which is requested by the user equipment to be reconfigured resource, and a reason for requesting reconfiguration.

Preferably, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

Figure 2:
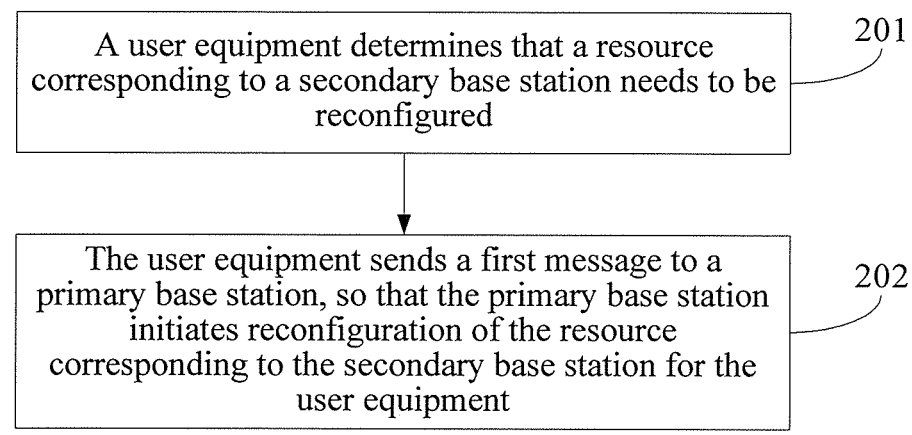
FIG. 2 is a flowchart of another resource reconfiguration method according to an embodiment of the present invention.

FIG. 2 is a flowchart of another resource reconfiguration method according to an embodiment of the present invention. As shown in FIG. 2, the method includes:

Step 201: A user equipment determines that a resource corresponding to a secondary base station needs to be reconfigured.

Step 202: The user equipment sends a first message to a primary base station, so that the primary base station initiates reconfiguration of the resource corresponding to the secondary base station for the user equipment.

In actual network deployment in the prior art, a case in which only a primary base station provides a reconfiguration function exists, and a secondary base station may not provide the reconfiguration function. By using this embodiment, the primary base station initiates reconfiguration of the resource corresponding to the secondary base station for the user equipment after receiving the first message. In this way, the resource corresponding to the secondary base station can be reconfigured for the user equipment in a case in which the secondary base station does not provide the reconfiguration function.

Preferably, after the user equipment sends the first message to the primary base station, the user equipment receives resource reconfiguration information sent by the primary base station, where the resource reconfiguration information is information about the resource that is reconfigured for the user equipment and corresponding to the secondary base station. By using this embodiment, the primary base station reconfigures the resource corresponding to the secondary base station for the user equipment.

Optionally, the resource reconfiguration information includes: a preamble sequence number and a physical random access channel sequence number that are allocated to the user equipment and corresponding to the secondary base station; and after receiving the resource reconfiguration information sent by the primary base station, the user equipment sends a random access request message to the secondary base station according to the preamble sequence number and the physical random access channel sequence number.

Optionally, the resource reconfiguration information includes: timing advance information and/or an uplink grant, for the user equipment, corresponding to the secondary base station; and after receiving the resource reconfiguration information sent by the primary base station, the user equipment sends an uplink signal to the secondary base station by using the timing advance information and/or the uplink grant.

Preferably, the resource reconfiguration information is determined by the primary base station for the user equipment.

Optionally, after the user equipment sends the first message to the primary base station, the user equipment receives resource reconfiguration information that is sent by the secondary base station and corresponding to the secondary base station, where the resource reconfiguration information is sent after the secondary base station receives a second message sent by the primary base station.

Preferably, the resource reconfiguration information includes: a preamble sequence number and a physical random access channel sequence number that are allocated to the user equipment and corresponding to the secondary base station; and after receiving the resource reconfiguration information sent by the secondary base station, the user equipment sends a random access request message to the secondary base station according to the preamble sequence number and the physical random access channel sequence number.

Preferably, the resource reconfiguration information includes: timing advance information and/or an uplink grant, for the user equipment, corresponding to the secondary base station; and after receiving the resource reconfiguration information sent by the secondary base station, the user equipment sends an uplink signal to the secondary base station by using the timing advance information and/or the uplink grant.

Optionally, the second message includes at least one piece of the following information: an identifier of the user equipment, a cell identifier of the secondary base station which is requested by the user equipment to be reconfigured resource, and a reason for requesting reconfiguration.

Preferably, after the user equipment sends the first message to the primary base station, the user equipment receives uplink resource configuration information that is sent by the primary base station and corresponding to the secondary base station.

Preferably, the uplink resource configuration information includes at least one of the following: scheduling request configuration information, sounding reference signal configuration information, and channel quality indicator reporting configuration information.

Optionally, the first message includes at least one piece of the following information: an identifier of the user equipment, a cell identifier of the secondary base station which is requested by the user equipment to be reconfigured resource, and a reason for requesting reconfiguration.

Preferably, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

Figure 3:
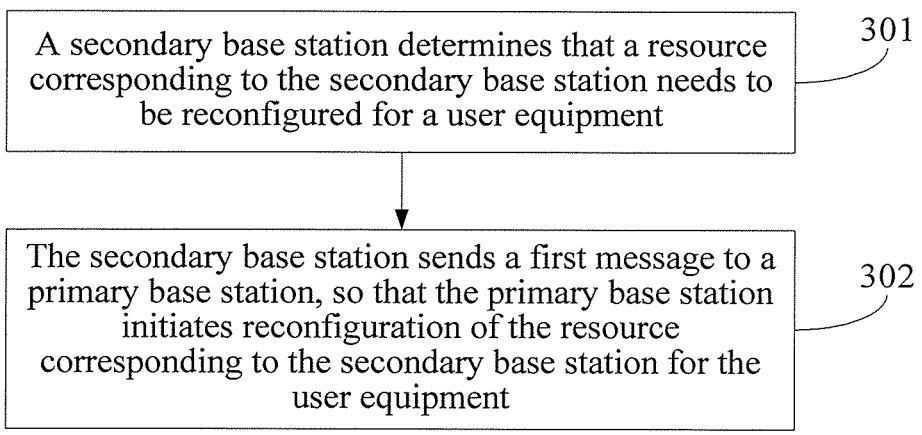
FIG. 3 is a flowchart of still another resource reconfiguration method according to an embodiment of the present invention.

FIG. 3 is a flowchart of still another resource reconfiguration method according to an embodiment of the present invention. As shown in FIG. 3, the method includes:

Step 301: A secondary base station determines that a resource corresponding to the secondary base station needs to be reconfigured for a user equipment.

Step 302: The secondary base station sends a first message to a primary base station, so that the primary base station initiates reconfiguration of the resource corresponding to the secondary base station for the user equipment.

In actual network deployment in the prior art, a case in which only a primary base station provides a reconfiguration function exists, and a secondary base station may not provide the reconfiguration function. By using this embodiment, the secondary base station sends the first message to the primary base station, so that the primary base station initiates reconfiguration of the resource corresponding to the secondary base station for the user equipment. In this way, the resource corresponding to the secondary base station can be reconfigured for the user equipment in a case in which the secondary base station does not provide the reconfiguration function.

Preferably, the determining, by a secondary base station, that a resource corresponding to the secondary base station needs to be reconfigured for a user equipment may include: when receiving, by the secondary base station, a random access request message sent by the user equipment, reconfiguration of the resource corresponding to the secondary base station for the user equipment; or when detecting, by the secondary base station, that a TAT, of the user equipment, corresponding to the secondary base station times out, reconfiguration of the resource corresponding to the secondary base station for the user equipment.

Preferably, the secondary base station may further send, to the primary base station, uplink resource configuration information that is configured for the user equipment and corresponding to the secondary base station, so that the primary base station sends the uplink resource configuration information to the user equipment.

By using this embodiment, the secondary base station sends to the user equipment, by using the primary base station, the uplink resource configuration information configured by the secondary base station for the user equipment. Because the secondary base station knows better about resource configuration of the secondary base station, configuration in this embodiment can better comply with an actual situation.

Preferably, the uplink resource configuration information includes at least one of the following: scheduling request configuration information, sounding reference signal configuration information, and channel quality indicator reporting configuration information.

Optionally, the first message includes at least one piece of the following information: an identifier of the user equipment, a cell identifier of the secondary base station which is requested by the user equipment to be reconfigured resource, and a reason for requesting reconfiguration.

Optionally, the reason for requesting reconfiguration is used to indicate one piece of the following information: a TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

The following describes implementation processes of embodiments of the present invention with reference to accompanying drawings.

Embodiment 1

Figure 4:
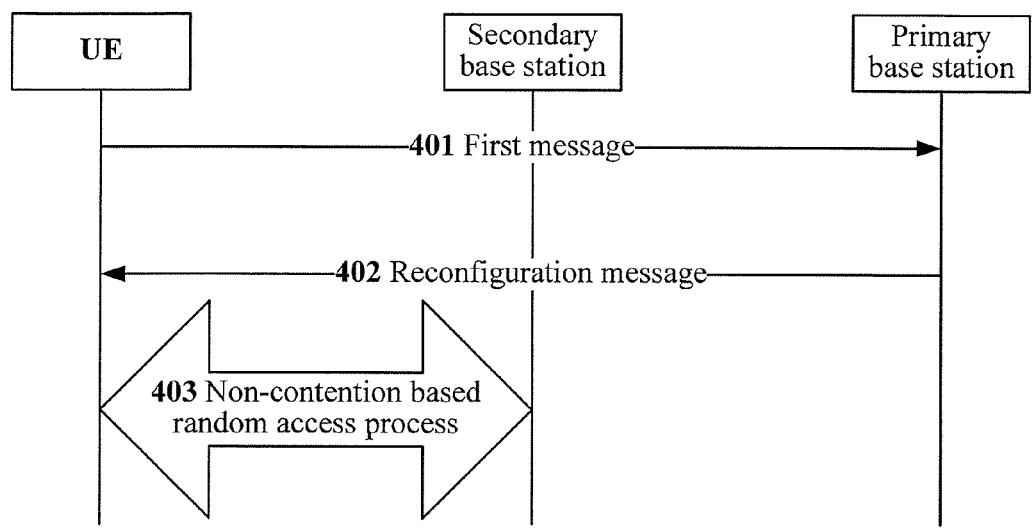
FIG. 4 is a flowchart of a resource reconfiguration method according to Embodiment 1 of the present invention.

This embodiment provides a resource reconfiguration method. As shown in FIG. 4, the method includes:

Step 401: If a UE detects that a TAT for a secondary base station times out, or an SR failure of a UE occurs in a secondary base station, or a UE has no PUCCH resource for sending an SR to a secondary base station, the UE sends a first message to a primary base station to request the primary base station to perform reconfiguration, where the first message may include the following information: a failure identifier (a cell identifier of the secondary base station which is requested by the user equipment to be reconfigured resource), and the information may be an identifier of a TA group corresponding to the TAT that times out, an identifier of a cell corresponding to the TAT that times out, an identifier of a cell corresponding to the SR failure, or an identifier of a corresponding cell having no PUCCH resource for sending an SR.

Optionally, the first message may include a reason for making a request (a reason for requesting reconfiguration), and the reason for making a request may indicate that a TAT times out, an SR fails, no PUCCH resource is available for sending an SR, or uplink data arrives. When the reason for making a request indicates that uplink data arrives, the primary base station can determine, according to a TAT maintained by the primary base station or the secondary base station and/or resource allocation information of the primary base station, whether a TAT times out on the UE side or no PUCCH resource is available for sending an SR on the UE side.

Step 402: The primary base station allocates a preamble (Preamble) sequence number and a physical random access channel (Physical Random Access Channel, PRACH for short) sequence number to the UE, and sends the allocated Preamble sequence number and PRACH sequence number to the UE by using a reconfiguration message.

Optionally, the primary base station may also send, to the UE, uplink resource configuration information that is allocated to the UE and corresponding to the secondary base station, so that the UE uses an uplink resource of the secondary base station according to the information. The uplink resource configuration information may include at least one of the following: SR configuration information, sounding reference signal configuration information, and CQI reporting configuration information.

It should be noted that if the primary base station sends, to the UE, the uplink resource configuration information that is allocated to the UE and corresponding to the secondary base station, the primary base station may send the Preamble sequence number, the PRACH sequence number, and the uplink resource configuration information by using a same message, and may also send the Preamble sequence number and the PRACH sequence number by using a message, and send the uplink resource configuration information by using another message.

Step 403: The UE initiates a non-contention based random access process by using the allocated Preamble sequence number and PRACH sequence number, and obtains an updated TA and an uplink grant (Uplink Grant) from the secondary base station by means of the random access process.

If the primary base station sends, to the UE, the uplink resource configuration information that is allocated to the UE and corresponding to the secondary base station, the UE may send, by using an uplink resource, a signal according to the uplink resource configuration information, the updated TA, and the uplink grant. If the primary base station does not send, to the UE, the uplink resource configuration information that is allocated to the UE and corresponding to the secondary base station, the UE may send, by using an uplink resource, a signal by using the updated TA, the uplink grant, and uplink resource configuration information stored in the UE. The uplink resource configuration information stored in the UE may be uplink resource configuration information that is previously allocated by the primary base station to the UE and is not deleted by the UE after a TAT times out or an SR failure occurs.

Embodiment 2

Figure 5:
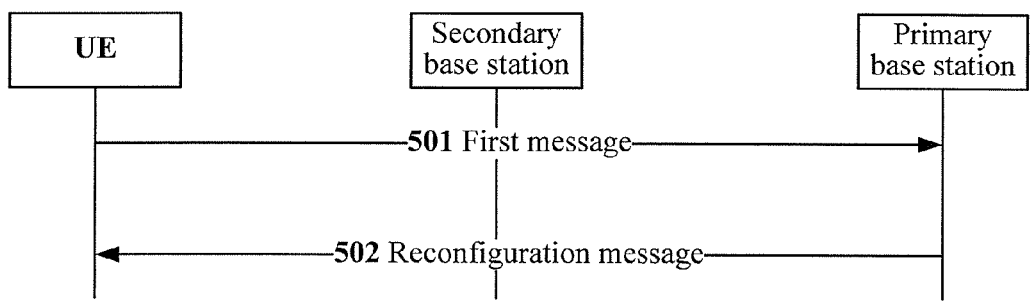
FIG. 5 is a flowchart of a resource reconfiguration method according to Embodiment 2 of the present invention.

This embodiment provides a resource reconfiguration method. As shown in FIG. 5, the method includes:

Step 501: If a UE detects that a TAT for a secondary base station times out, or an SR failure of a UE occurs in a secondary base station, or a UE has no PUCCH resource for sending an SR to a secondary base station, the UE sends a first message to a primary base station to request the primary base station to perform reconfiguration, where the first message may include the following information: a failure identifier (a cell identifier of the secondary base station which is requested by the user equipment to be reconfigured resource), and the information may be an identifier of a TA group corresponding to the TAT that times out, an identifier of a cell corresponding to the TAT that times out, an identifier of a cell corresponding to the SR failure, or an identifier of a corresponding cell having no PUCCH resource for sending an SR.

Optionally, the first message may include a reason for making a request (a reason for requesting reconfiguration), and the reason for making a request may indicate that a TAT times out, an SR fails, no PUCCH resource is available for sending an SR, or uplink data arrives.

Step 502: The primary base station sends a reconfiguration message to the UE, where the reconfiguration message includes at least one type of the following information: uplink resource configuration information, an absolute value or a relative value of a TA of the secondary base station, and an uplink grant, where content of the uplink resource configuration information includes content of the uplink resource configuration information in Embodiment 1.

It should be noted that if two types of information of the foregoing three types of information simultaneously exist, the two types of information may be simultaneously sent by using one message, and may also be separately sent by using two messages; if the foregoing three types of information simultaneously exist, the three types of information may be simultaneously sent by using one message, may be separately sent by using two messages, and may also be separately sent by using three messages.

If the information sent by the primary base station to the UE includes the uplink resource configuration information, the absolute value or the relative value of the TA of the secondary base station, and the uplink grant, the UE obtains the TA of the secondary base station according to the absolute value or the relative value of the TA of the secondary base station, and sends, by using an uplink resource of the secondary base station, a signal according to the uplink resource configuration information, the TA of the secondary base station, and the uplink grant. If the information sent by the primary base station to the UE does not include the absolute value or the relative value of the TA of the secondary base station, the UE may obtain the TA in another manner, for example, using a TA previously used by the UE, or may obtain the TA by means of a contention-based random access process or a non-contention based random access process, and then sends, by using an uplink resource of the secondary base station, a signal according to the obtained TA. If the information sent by the primary base station to the UE does not include the uplink resource configuration information, the UE may obtain the uplink resource configuration information in another manner, for example, using uplink resource configuration information previously used by the UE, and then sends, by using an uplink resource of the secondary base station, a signal according to the obtained uplink resource configuration information. If the information sent by the primary base station to the UE does not include the uplink grant, the UE may obtain the uplink grant in another manner, for example, obtaining the uplink grant by initiating a contention-based random access process or a non-contention based random access process to the secondary base station, or applying for the uplink grant by sending an SR to the secondary base station, and then sends, by using an uplink resource of the secondary base station, a signal according to the obtained uplink grant.

Embodiment 3

Figure 6:
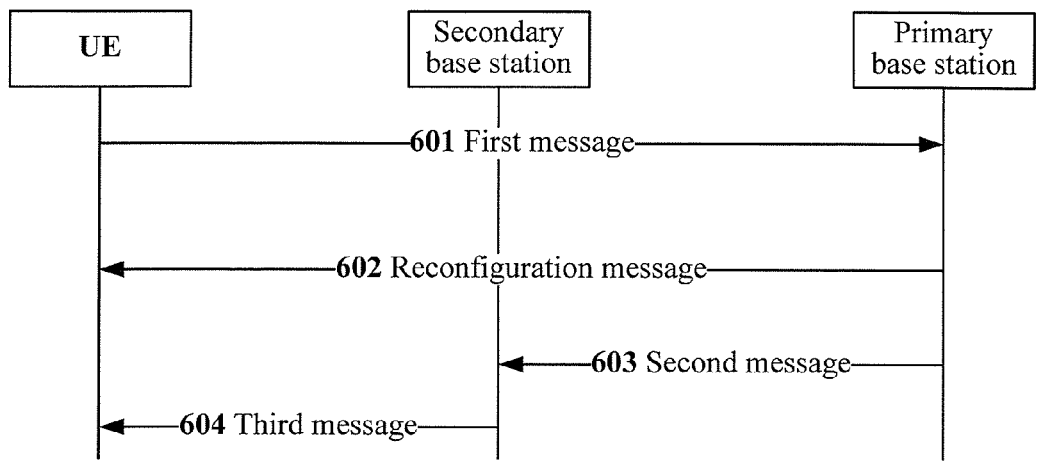
FIG. 6 is a flowchart of a resource reconfiguration method according to Embodiment 3 of the present invention.

This embodiment provides a resource reconfiguration method. As shown in FIG. 6, the method includes:

Step 601: If a UE detects that a TAT for a secondary base station times out, or an SR failure of a UE occurs in a secondary base station, or a UE has no PUCCH resource for sending an SR to a secondary base station, the UE sends a first message to a primary base station to request the primary base station to perform reconfiguration, where the first message may include the following information: a failure identifier (a cell identifier of the secondary base station which is requested by the user equipment to be reconfigured resource), and the information may be an identifier of a TA group corresponding to the TAT that times out, an identifier of a cell corresponding to the TAT that times out, an identifier of a cell corresponding to the SR failure, or an identifier of a corresponding cell having no PUCCH resource for sending an SR.

Optionally, the first message may include a reason for making a request (a reason for requesting reconfiguration), and the reason for making a request may indicate that a TAT times out, an SR fails, no PUCCH resource is available for sending an SR, or uplink data arrives.

Step 602: The primary base station sends a first reconfiguration message to the UE, where the first reconfiguration message includes uplink resource configuration, so that the UE uses an uplink resource of the secondary base station according to the information, where content of the uplink resource configuration information includes content of the uplink resource configuration information in Embodiment 1.

Step 603: The primary base station sends a second message to the secondary base station, where the second message includes an identifier of the UE.

Optionally, the second message may also include at least one of the following: a failure identifier and a reason for making a request.

Step 604: The secondary base station sends a third message to the UE, where the third message includes at least one type of the following information: an absolute value or a relative value of a TA of the secondary base station, and an uplink grant, so that the UE obtains the TA of the secondary base station and/or the uplink grant according to the information.

It should be noted that a sequence of performing step 602 and step 603 is not limited. It may be that step 602 is performed prior to step 603, it may also be that step 603 is performed prior to step 602, and it may further be that step 602 and step 603 are simultaneously performed.

Preferably, step 603 and step 604 may also not be included in this embodiment, and in this case, the UE knows the TA in advance. This embodiment is applicable to a case in which an SR failure of the UE occurs in the secondary base station, or the UE has no PUCCH resource for sending an SR to the secondary base station.

Preferably, in this embodiment, step 602 may also not be included, and step 603 and step 604 are directly performed after step 601. In this case, the UE may use previously used uplink resource configuration information. This embodiment is applicable to each of a case in which the UE detects that a TAT for the secondary base station times out, a case in which an SR failure of the UE occurs in the secondary base station, and a case in which the UE has no PUCCH resource for sending an SR to the secondary base station.

Embodiment 4

Figure 7:
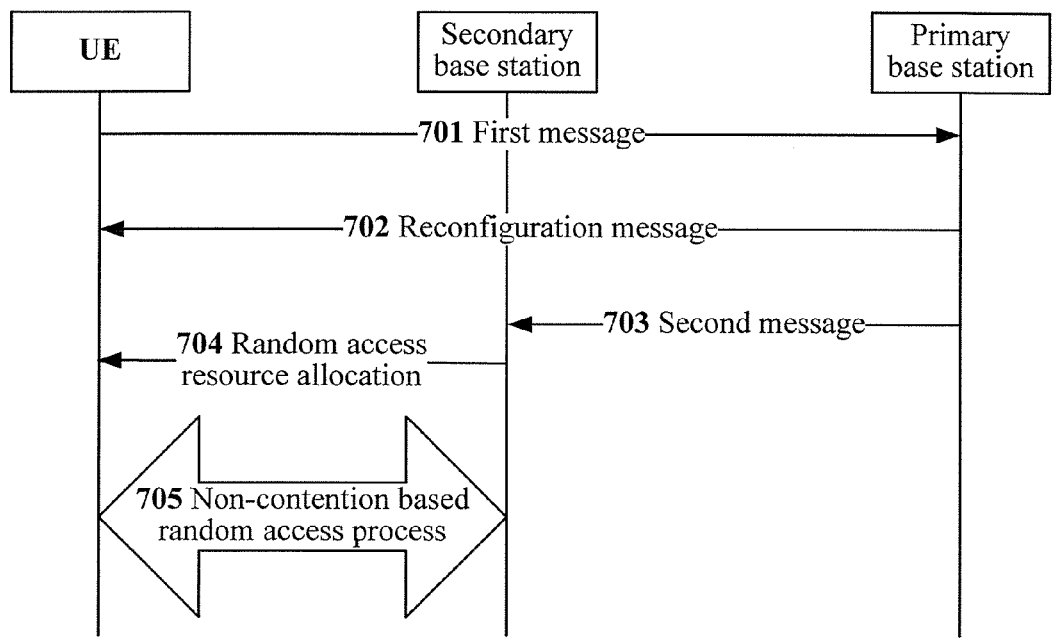
FIG. 7 is a flowchart of a resource reconfiguration method according to Embodiment 4 of the present invention.

This embodiment provides a resource reconfiguration method. As shown in FIG. 7, the method includes:

Step 701: If a UE detects that a TAT for a secondary base station times out, or an SR failure of a UE occurs in a secondary base station, or a UE has no PUCCH resource for sending an SR to a secondary base station, the UE sends a first message to a primary base station to request the primary base station to perform reconfiguration, where the first message may include the following information: a failure identifier (a cell identifier of the secondary base station which is requested by the user equipment to be reconfigured resource), and the information may be an identifier of a TA group corresponding to the TAT that times out, an identifier of a cell corresponding to the TAT that times out, an identifier of a cell corresponding to the SR failure, or an identifier of a corresponding cell having no PUCCH resource for sending an SR.

Optionally, the first message may include a reason for making a request (a reason for requesting reconfiguration), and the reason for making a request may indicate that a TAT times out, an SR fails, no PUCCH resource is available for sending an SR, or uplink data arrives.

Step 702: The primary base station sends a first reconfiguration message to the UE, where the first reconfiguration message may include uplink resource configuration information, so that the UE uses an uplink resource of the secondary base station according to the information, where content of the uplink resource configuration information includes content of the uplink resource configuration information in Embodiment 1.

Step 703: The primary base station sends a second message to the secondary base station, where the second message may include an identifier of the UE.

Optionally, the second message may include at least one of the following: a failure identifier and a reason for making a request.

Step 704: The secondary base station sends a random access resource allocation message to the UE, where the random access resource allocation message includes: a Preamble sequence number and a PRACH sequence number.

Step 705: The UE initiates a non-contention based random access process to the secondary base station by using the received Preamble sequence number and PRACH sequence number, and the UE obtains an updated TA and an uplink grant from the secondary base station by means of the process.

Preferably, in this embodiment, step 702 may also not be included, and step 703, step 704, and step 705 are directly performed after step 701. In this case, the UE may use previously used uplink resource configuration information. This embodiment is applicable to each of a case in which the UE detects that a TAT for the secondary base station times out, a case in which an SR failure of the UE occurs in the secondary base station, and a case in which the UE has no PUCCH resource for sending an SR to the secondary base station.

It should be noted that a sequence of performing step 702 and step 703 is not limited. It may be that step 702 is performed prior to step 703, it may also be that step 703 is performed prior to step 702, and it may further be that step 702 and step 703 are simultaneously performed.

Embodiment 5

Figure 8:
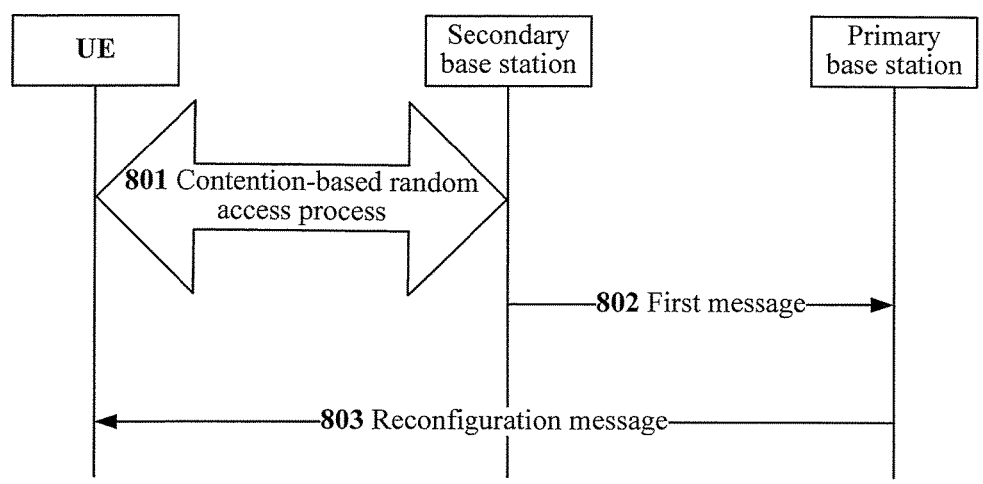
FIG. 8 is a flowchart of a resource reconfiguration method according to Embodiment 5 of the present invention.

This embodiment provides a resource reconfiguration method. As shown in FIG. 8, the method includes:

Step 801: If a UE detects that a TAT for a secondary base station times out, or an SR failure of a UE occurs in a secondary base station, or a UE has no PUCCH resource for sending an SR to a secondary base station, the UE initiates a contention-based random access process to the secondary base station, and the UE obtains an updated TA of the secondary base station and an uplink grant by means of this process.

Step 802: The secondary base station sends a first message to a primary base station, where the first message includes: an identifier of the UE and a failure identifier (a cell identifier of the secondary base station which is requested by the user equipment to be reconfigured resource), and the failure identifier may be an identifier of a TA group corresponding to the TAT that times out, an identifier of a cell corresponding to the TAT that times out, an identifier of a cell corresponding to the SR failure, or an identifier of a corresponding cell having no PUCCH resource for sending an SR.

Optionally, the first message may also include at least one of the following: a reason for making a request (a reason for requesting reconfiguration), where the reason for making a request may indicate that a TAT times out, an SR fails, no PUCCH resource is available for sending an SR, or data arrives; and uplink resource configuration information, where content of the uplink resource configuration information includes content of the uplink resource configuration information in Embodiment 1.

Step 803: The primary base station sends a reconfiguration message to the UE, where the reconfiguration message includes uplink resource configuration information, so that the UE uses an uplink resource of the secondary base station according to the information.

If the first message in step 802 includes the uplink resource configuration information, the uplink resource configuration in the reconfiguration message is the uplink resource configuration information in step 802.

If the first message in step 802 does not include the uplink resource configuration information, the uplink resource configuration information in the reconfiguration message is determined by the primary base station.

It should be noted that in this embodiment, the secondary base station performs step 802 after receiving a random access request message sent by the UE, and a sequence of receiving another message in the random access process and performing step 802 is not limited. In another embodiment, step 801 may not be performed, and the secondary base station may perform step 802 in a case in which it is determined that a TAT, of the UE, corresponding to the secondary base station times out. This embodiment is applicable to a case in which the secondary base station has downlink data to be sent to the UE.

It should be noted that in this embodiment, the UE in step 803 is a UE identified by the UE identifier in step 802. In another embodiment, the UE in step 803 may also be a UE determined by the primary base station, and is different from the UE identified by the UE identifier in step 802. This embodiment is applicable to a case in which neither uplink data nor downlink data is to be sent between the UE and the secondary base station temporarily, and an uplink resource that is previously allocated to the UE and corresponding to the secondary base station may be allocated to and used by another UE.

Embodiments of the present invention further provide apparatus embodiments, and apparatuses in the apparatus embodiments can be configured to implement the foregoing method embodiments. The following describes the apparatus embodiments in the embodiments of the present invention in detail.

Figure 9:
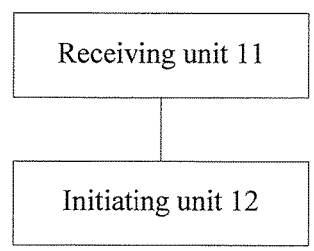
FIG. 9 is a structural block diagram of a primary base station according to an embodiment of the present invention.

An embodiment of the present invention provides a base station, where the base station may be used as a primary base station. As shown in FIG. 9, the base station includes: a receiving unit 11, configured to receive a first message, where the first message is used to request to reconfigure, for a user equipment, a resource corresponding to a secondary base station; and an initiating unit 12, coupled to the receiving unit 11, and configured to initiate reconfiguration of the resource corresponding to the secondary base station for the user equipment.

Figure 10:
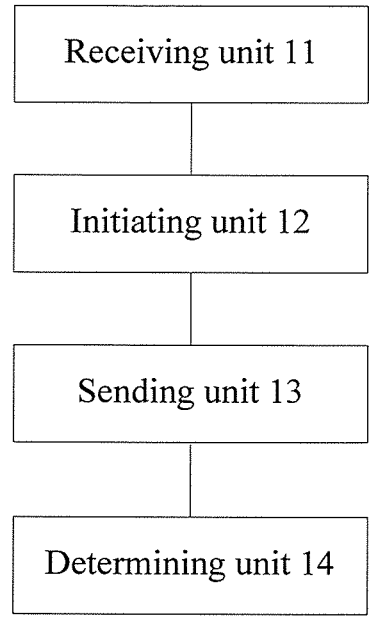
FIG. 10 is a preferred structural block diagram of a primary base station according to an embodiment of the present invention.

Preferably, as shown in FIG. 10, the receiving unit is configured to receive the first message from the user equipment; and the primary base station further includes a sending unit 13 coupled to the initiating unit 12, and the initiating unit 12 is configured to control the sending unit 13 to send resource reconfiguration information to the user equipment, where the resource reconfiguration information is information about the resource that is reconfigured for the user equipment and corresponding to the secondary base station.

Optionally, the resource reconfiguration information includes: a preamble sequence number and a physical random access channel sequence number that are allocated to the user equipment and corresponding to the secondary base station; and the initiating unit 12 is configured to control the sending unit 13 to send the preamble sequence number and the physical random access channel sequence number to the user equipment, so that the user equipment sends a random access request message to the secondary base station according to the preamble sequence number and the physical random access channel sequence number.

Optionally, the resource reconfiguration information includes: timing advance information and/or an uplink grant, for the user equipment, corresponding to the secondary base station; and the initiating unit 12 is configured to control the sending unit 13 to send the timing advance information and/or the uplink grant to the user equipment.

Optionally, the primary base station further includes: a determining unit 14, coupled to the sending unit 13, and configured to determine the resource reconfiguration information for the user equipment before the primary base station sends the resource reconfiguration information to the user equipment.

Preferably, the receiving unit 11 is configured to receive the first message from the user equipment; and the primary base station further includes a sending unit 13, and the initiating unit 12 is configured to control the sending unit 13 to send a second message to the secondary base station, so that the secondary base station sends resource reconfiguration information corresponding to the secondary base station to the user equipment.

Preferably, the initiating unit 12 is configured to control the sending unit 13 to send the second message to the secondary base station, where the second message is used to request the secondary base station to allocate a preamble sequence number and a physical random access channel sequence number to the user equipment, and send the preamble sequence number and the physical random access channel sequence number to the user equipment, so that the user equipment sends a random access request message to the secondary base station according to the preamble sequence number and the physical random access channel sequence number.

Optionally, the initiating unit 12 is configured to control the sending unit 13 to send the second message to the secondary base station, where the second message is used to request the secondary base station to send a third message to the user equipment, where the third message includes timing advance information and/or an uplink grant, for the user equipment, corresponding to the secondary base station.

Preferably, the second message includes at least one piece of the following information: an identifier of the user equipment, a cell identifier of the secondary base station which is requested by the user equipment to be reconfigured resource, and a reason for requesting reconfiguration.

Optionally, the receiving unit 11 is configured to receive the first message sent by the secondary base station.

Preferably, the first message is sent after the secondary base station receives a random access request message sent by the user equipment, or the first message is sent after the secondary base station detects that a timing advance timer TAT, of the user equipment, corresponding to the secondary base station times out.

Optionally, the receiving unit 11 is further configured to receive uplink resource configuration information that is sent by the secondary base station, configured for the user equipment, and corresponding to the secondary base station; and the primary base station further includes a sending unit 13, and the initiating unit 12 is configured to control the sending unit 13 to send the uplink resource configuration information to the user equipment.

Optionally, the primary base station further includes a sending unit 13, and the initiating unit 12 is configured to control the sending unit 13 to send uplink resource configuration information corresponding to the secondary base station to the user equipment.

Preferably, the uplink resource configuration information includes at least one of the following: scheduling request configuration information, sounding reference signal configuration information, and channel quality indicator reporting configuration information.

Preferably, the first message includes at least one piece of the following information: an identifier of the user equipment, a cell identifier of the secondary base station which is requested by the user equipment to be reconfigured resource, and a reason for requesting reconfiguration.

Optionally, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

Figure 11:
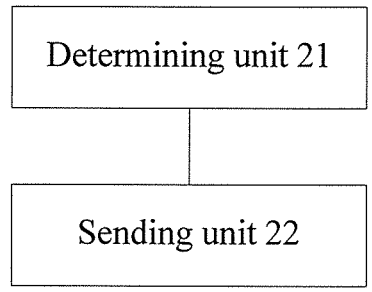
FIG. 11 is a structural block diagram of a user equipment according to an embodiment of the present invention.

An embodiment of the present invention further provides a user equipment. As shown in FIG. 11, the user equipment includes: a determining unit 21, configured to determine that a resource corresponding to a secondary base station needs to be reconfigured; and a sending unit 22, coupled to the determining unit 21, and configured to send a first message to a primary base station, so that the primary base station initiates reconfiguration of the resource corresponding to the secondary base station for the user equipment.

Figure 12:
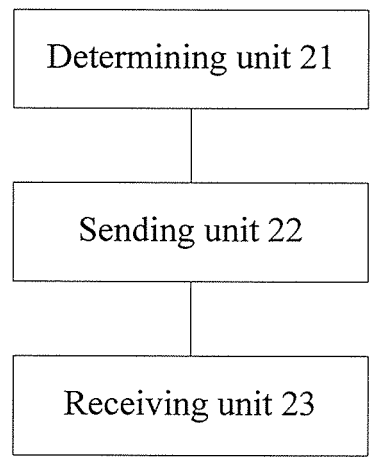
FIG. 12 is a preferred structural block diagram of a user equipment according to an embodiment of the present invention.

Preferably, as shown in FIG. 12, the user equipment further includes a receiving unit 23, configured to: after the first message is sent to the primary base station, receive resource reconfiguration information sent by the primary base station, where the resource reconfiguration information is information about the resource that is reconfigured for the user equipment and corresponding to the secondary base station.

Preferably, the resource reconfiguration information includes: a preamble sequence number and a physical random access channel sequence number that are allocated to the user equipment and corresponding to the secondary base station; and the sending unit 22 is further configured to: after the resource reconfiguration information sent by the primary base station is received, send a random access request message to the secondary base station according to the preamble sequence number and the physical random access channel sequence number.

Optionally, the resource reconfiguration information includes: timing advance information and/or an uplink grant, for the user equipment, corresponding to the secondary base station; and the sending unit 22 is further configured to: after the resource reconfiguration information sent by the primary base station is received, send an uplink signal to the secondary base station by using the timing advance information and/or the uplink grant.

Preferably, the resource reconfiguration information is determined by the primary base station for the user equipment.

Optionally, the user equipment further includes a receiving unit 23, configured to: after the user equipment sends the first message to the primary base station, receive resource reconfiguration information that is sent by the secondary base station and corresponding to the secondary base station, where the resource reconfiguration information is sent after the secondary base station receives a second message sent by the primary base station.

Preferably, the resource reconfiguration information includes: a preamble sequence number and a physical random access channel sequence number that are allocated to the user equipment and corresponding to the secondary base station; and the sending unit 22 is configured to: after the resource reconfiguration information sent by the secondary base station is received, send a random access request message to the secondary base station according to the preamble sequence number and the physical random access channel sequence number.

Optionally, the resource reconfiguration information includes: timing advance information and/or an uplink grant, for the user equipment, corresponding to the secondary base station; and the sending unit 22 is configured to: after the resource reconfiguration information sent by the secondary base station is received, send an uplink signal to the secondary base station by using the timing advance information and/or the uplink grant.

Optionally, the second message includes at least one piece of the following information: an identifier of the user equipment, a cell identifier of the secondary base station which is requested by the user equipment to be reconfigured resource, and a reason for requesting reconfiguration.

Preferably, the user equipment further includes a receiving unit 23, configured to: after the user equipment sends the first message to the primary base station, receive uplink resource configuration information that is sent by the primary base station and corresponding to the secondary base station.

Optionally, the uplink resource configuration information includes at least one of the following: scheduling request configuration information, sounding reference signal configuration information, and channel quality indicator reporting configuration information.

Preferably, the first message includes at least one piece of the following information: an identifier of the user equipment, a cell identifier of the secondary base station which is requested by the user equipment to be reconfigured resource, and a reason for requesting reconfiguration.

Preferably, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

Figure 13:
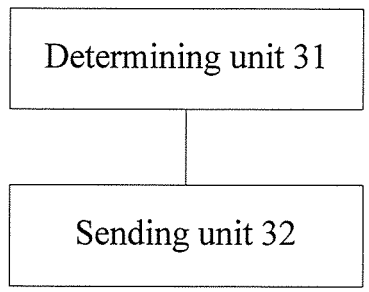
FIG. 13 is a structural block diagram of a secondary base station according to an embodiment of the present invention.

An embodiment of the present invention further provides a base station, where the base station may be used as a secondary base station. As shown in FIG. 13, the base station includes: a determining unit 31, configured to determine that a resource corresponding to the secondary base station needs to be reconfigured for a user equipment; and a sending unit 32, coupled to the determining unit 31, and configured to send a first message to a primary base station, so that the primary base station initiates reconfiguration of the resource corresponding to the secondary base station for the user equipment.

Figure 14:
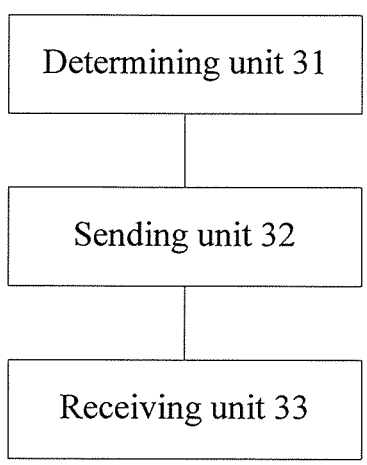
FIG. 14 is a preferred structural block diagram of a secondary base station according to an embodiment of the present invention.

Preferably, as shown in FIG. 14, the secondary base station includes: a receiving unit 33, and in a case in which the receiving unit 33 receives a random access request message sent by the user equipment, the determining unit 31 determines reconfiguration of the resource corresponding to the secondary base station for the user equipment, or in a case in which it is detected that a timing advance timer TAT, of the user equipment, corresponding to the secondary base station times out, the determining unit 31 determines reconfiguration of the resource corresponding to the secondary base station for the user equipment.

Preferably, the sending unit 32 is configured to: after it is determined that the resource corresponding to the secondary base station needs to be reconfigured for the user equipment, send, to the primary base station, uplink resource configuration information that is configured for the user equipment and corresponding to the secondary base station, so that the primary base station sends the uplink resource configuration information to the user equipment.

Optionally, the uplink resource configuration information includes at least one of the following: scheduling request configuration information, sounding reference signal configuration information, and channel quality indicator reporting configuration information.

Preferably, the first message includes at least one piece of the following information: an identifier of the user equipment, a cell identifier of the secondary base station which is requested by the user equipment to be reconfigured resource, and a reason for requesting reconfiguration.

Preferably, the reason for requesting reconfiguration is used to indicate one piece of the following information: a TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

Figure 15:
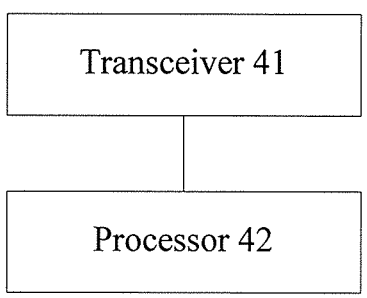
FIG. 15 is a structural block diagram of another primary base station according to an embodiment of the present invention.

An embodiment of the present invention further provides a base station, where the base station may be used as a primary base station. As shown in FIG. 15, the base station includes: a transceiver 41, configured to receive and transmit a signal; and a processor 42, coupled to the transceiver 41, and configured to perform the following steps: controlling the transceiver to receive a first message, where the first message is used to request to reconfigure, for a user equipment, a resource corresponding to a secondary base station; and initiating reconfiguration of the resource corresponding to the secondary base station for the user equipment.

Preferably, the processor 42 controls, in the following manner, the transceiver to receive the first message: controlling the transceiver 41 to receive the first message from the user equipment; and the processor 42 initiates reconfiguration of the resource corresponding to the secondary base station for the user equipment in the following manner: controlling the transceiver 41 to send resource reconfiguration information to the user equipment, where the resource reconfiguration information is information about the resource that is reconfigured for the user equipment and corresponding to the secondary base station.

Optionally, the resource reconfiguration information includes: a preamble sequence number and a physical random access channel sequence number that are allocated to the user equipment and corresponding to the secondary base station; and the processor 42 controls, in the following manner, the transceiver 41 to send the resource reconfiguration information to the user equipment: controlling the transceiver 41 to send the preamble sequence number and the physical random access channel sequence number to the user equipment, so that the user equipment sends a random access request message to the secondary base station according to the preamble sequence number and the physical random access channel sequence number.

Optionally, the resource reconfiguration information includes: timing advance information and/or an uplink grant, for the user equipment, corresponding to the secondary base station; and the processor 42 controls, in the following manner, the transceiver 41 to send the resource reconfiguration information to the user equipment includes: controlling the transceiver 41 to send the timing advance information and/or the uplink grant to the user equipment.

Preferably, the processor 42 determines the resource reconfiguration information for the user equipment before the resource reconfiguration information is sent to the user equipment.

Preferably, the processor 42 controls, in the following manner, the transceiver to receive the first message: controlling the transceiver 41 to receive the first message from the user equipment; and the processor 42 initiates reconfiguration of the resource corresponding to the secondary base station for the user equipment in the following manner: controlling the transceiver 41 to send a second message to the secondary base station, so that the secondary base station sends resource reconfiguration information corresponding to the secondary base station to the user equipment.

Optionally, the processor 42 controls, the transceiver 41 to send the second message to the secondary base station, where the second message is used to trigger the secondary base station to send the resource reconfiguration information corresponding to the secondary base station to the user equipment: the processor 42 controls, the transceiver 41 to send the second message to the secondary base station, where the second message is used to request the secondary base station to allocate a preamble sequence number and a physical random access channel sequence number to the user equipment, and send the preamble sequence number and the physical random access channel sequence number to the user equipment, so that the user equipment sends a random access request message to the secondary base station according to the preamble sequence number and the physical random access channel sequence number.

Preferably, the processor 42 controls, the transceiver 41 to send the second message to the secondary base station, where the second message is used to trigger the secondary base station to send the resource reconfiguration information corresponding to the secondary base station to the user equipment includes: controlling the transceiver to send the second message to the secondary base station, where the second message is used to request the secondary base station to send a third message to the user equipment, where the third message includes timing advance information and/or an uplink grant, for the user equipment, corresponding to the secondary base station.

Preferably, the second message includes at least one piece of the following information: an identifier of the user equipment, a cell identifier of the secondary base station which is requested by the user equipment to be reconfigured resource, and a reason for requesting reconfiguration.

Optionally, the processor 42 controls, the transceiver to receive the first message: controlling the transceiver 41 to receive the first message sent by the secondary base station.

Optionally, the first message is sent after the secondary base station receives a random access request message sent by the user equipment, or the first message is sent after the secondary base station detects that a timing advance timer TAT, of the user equipment, corresponding to the secondary base station times out.

Optionally, the processor 42 controls the transceiver to receive uplink resource configuration information that is sent by the secondary base station, configured for the user equipment, and corresponding to the secondary base station; and the processor 42 initiates reconfiguration of the resource corresponding to the secondary base station for the user equipment in the following manner: controlling the transceiver 41 to send the uplink resource configuration information to the user equipment.

Preferably, the processor 42 initiates reconfiguration of the resource corresponding to the secondary base station for the user equipment in the following manner: controlling the transceiver 41 to send, to the user equipment, uplink resource configuration information corresponding to the secondary base station.

Preferably, the uplink resource configuration information includes at least one of the following: scheduling request configuration information, sounding reference signal configuration information, and channel quality indicator reporting configuration information.

Optionally, the first message includes at least one piece of the following information: an identifier of the user equipment, a cell identifier of the secondary base station which is requested by the user equipment to be reconfigured resource, and a reason for requesting reconfiguration.

Optionally, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

Figure 16:
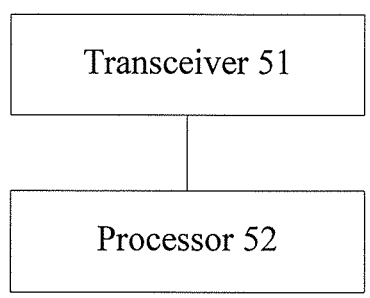
FIG. 16 is a structural block diagram of another user equipment according to an embodiment of the present invention.

An embodiment of the present invention provides a user equipment. As shown in FIG. 16, the user equipment includes: a transceiver 51, configured to receive and transmit a signal; and a processor 52, coupled to the transceiver 51, and configured to perform the following steps: determining that a resource corresponding to a secondary base station needs to be reconfigured; and controlling the transceiver to send a first message to a primary base station, so that the primary base station initiates reconfiguration of the resource corresponding to the secondary base station for the user equipment.

Preferably, after the user equipment sends the first message to the primary base station, the processor 52 controls the transceiver 51 to receive resource reconfiguration information sent by the primary base station, where the resource reconfiguration information is information about the resource that is reconfigured for the user equipment and corresponding to the secondary base station.

Preferably, the resource reconfiguration information includes: a preamble sequence number and a physical random access channel sequence number that are allocated to the user equipment and corresponding to the secondary base station; and after the resource reconfiguration information sent by the primary base station is received, the processor 52 controls the transceiver 51 to send a random access request message to the secondary base station according to the preamble sequence number and the physical random access channel sequence number.

Optionally, the resource reconfiguration information includes: timing advance information and/or an uplink grant, for the user equipment, corresponding to the secondary base station; and after the resource reconfiguration information sent by the primary base station is received, the processor 52 controls the transceiver 51 to send an uplink signal to the secondary base station by using the timing advance information and/or the uplink grant.

Preferably, the resource reconfiguration information is determined by the primary base station for the user equipment.

Optionally, after the first message is sent to the primary base station, the processor 52 controls the transceiver 51 to receive resource reconfiguration information that is sent by the secondary base station and corresponding to the secondary base station, where the resource reconfiguration information is sent after the secondary base station receives a second message sent by the primary base station.

Preferably, the resource reconfiguration information includes: a preamble sequence number and a physical random access channel sequence number that are allocated to the user equipment and corresponding to the secondary base station; and after the resource reconfiguration information sent by the secondary base station is received, the processor 52 controls the transceiver 51 to send a random access request message to the secondary base station according to the preamble sequence number and the physical random access channel sequence number.

Optionally, the resource reconfiguration information includes: timing advance information and/or an uplink grant, for the user equipment, corresponding to the secondary base station; and after the resource reconfiguration information sent by the secondary base station is received, the processor 52 controls the transceiver 51 to send an uplink signal to the secondary base station by using the timing advance information and/or the uplink grant.

Preferably, the second message includes at least one piece of the following information: an identifier of the user equipment, a cell identifier of the secondary base station which is requested by the user equipment to be reconfigured resource, and a reason for requesting reconfiguration.

Preferably, after the first message is sent to the primary base station, the processor 52 controls the transceiver 51 to receive uplink resource configuration information that is sent by the primary base station and corresponding to the secondary base station.

Preferably, the uplink resource configuration information includes at least one of the following: scheduling request configuration information, sounding reference signal configuration information, and channel quality indicator reporting configuration information.

Preferably, the first message includes at least one piece of the following information: an identifier of the user equipment, a cell identifier of the secondary base station which is requested by the user equipment to be reconfigured resource, and a reason for requesting reconfiguration.

Preferably, the reason for requesting reconfiguration is used to indicate one piece of the following information: a timing advance timer TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

Figure 17:
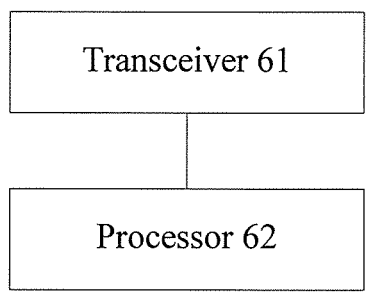
FIG. 17 is a structural block diagram of another secondary base station according to an embodiment of the present invention.

An embodiment of the present invention discloses a base station, where the base station may be used as a secondary base station. As shown in FIG. 17, the base station includes: a transceiver 61, configured to receive and transmit a signal; and a processor 62, coupled to the transceiver 61, and configured to perform the following steps: determining that a resource corresponding to the secondary base station needs to be reconfigured for a user equipment; and controlling the transceiver to send a first message to a primary base station, so that the primary base station initiates reconfiguration of the resource corresponding to the secondary base station for the user equipment.

Preferably, the processor 62 determines, in the following manner, that the resource corresponding to the secondary base station needs to be reconfigured for the user equipment: if the transceiver 61 receives a random access request message sent by the user equipment, the processor 62 determines reconfiguration of the resource corresponding to the secondary base station for the user equipment; or if the processor 62 detects that a timing advance timer TAT, of the user equipment, corresponding to the secondary base station times out, the processor 62 determines reconfiguration of the resource corresponding to the secondary base station for the user equipment.

Optionally, after determining that the resource corresponding to the secondary base station needs to be reconfigured for the user equipment, the processor 62 controls the transceiver 61 to send, to the primary base station, uplink resource configuration information that is configured for the user equipment and corresponding to the secondary base station, so that the primary base station sends the uplink resource configuration information to the user equipment.

Optionally, the uplink resource configuration information includes at least one of the following: scheduling request configuration information, sounding reference signal configuration information, and channel quality indicator reporting configuration information.

Preferably, the first message includes at least one piece of the following information: an identifier of the user equipment, a cell identifier of the secondary base station which is requested by the user equipment to be reconfigured resource, and a reason for requesting reconfiguration.

Optionally, the reason for requesting reconfiguration is used to indicate one piece of the following information: a TAT times out, a scheduling request SR fails, the secondary base station has no physical uplink control channel PUCCH resource for sending an SR, the user equipment needs to send uplink data to the secondary base station, and the secondary base station needs to send downlink data to the user equipment.

The processor in the embodiments of the present invention may be an integrated circuit chip having a signal processing capability, and may also be a hardware processor such as a central processing unit (Central Processing Unit, CPU for short). In an implementation process, steps in the foregoing methods may be completed by using a hardware integrated logical circuit in the processor, or by using instructions in a form of software. The instructions may cooperate with the processor therein in implementation and control, so as to execute the methods disclosed in the embodiments of the present invention. The processor may be a general-purpose processor, a digital signal processor (Digital Signal Processor, DSP for short), an application specific integrated circuit (Application Specific Integrated Circuit, ASIC for short), a field programmable gate array (Field Programmable Gate Array, FPGA for short) or another programmable logical device, a discrete gate or transistor logical device, or a discrete hardware assembly, and can implement or execute the methods, steps, and logical block diagrams disclosed in the embodiments of the present invention. A general purpose processor may be a microprocessor or the processor may also be any conventional processor, decoder, and the like. Steps of the methods disclosed with reference to the embodiments of the present invention may be directly executed and accomplished by means of a hardware processor, or may be executed and accomplished by using a combination of hardware and software modules in the processor. The software module may be located in a mature storage medium in the field, such as a random access memory, a flash memory, a read-only memory, a programmable read-only memory, an electrically-erasable programmable memory or a register.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. By way of example, and not limitation, the computer-readable medium may include a random access memory (Random Access Memory, RAM for short), a read-only memory (Read-Only Memory, ROM for short), an electrically erasable programmable read-only memory (Electrically Erasable Programmable Read-Only Memory, EEPROM for short), a compact disc read-only memory (Compact Disc Read-Only Memory, CD-ROM for short), or another optical disc storage or disk storage medium, or another magnetic storage device, or any other medium that can be configured to carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (Digital Subscriber Line, DSL for short) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc (Compact Disc, CD for short), a laser disc, an optical disc, a digital versatile disc (Digital Versatile Disk, DVD for short), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A resource reconfiguration method, comprising:
receiving, by a primary base station, a first message sent by a secondary base station after the secondary base station detects that a timing advance timer (TAT) maintained by a user equipment corresponding to the secondary base station times out, wherein the first message is for requesting to reconfigure, for the user equipment, a resource corresponding to the secondary base station, wherein the user equipment simultaneously communicates with the primary base station and the secondary base station, and wherein the first message comprises a first field carrying a reason for requesting reconfiguration;
receiving, by the primary base station, uplink resource configuration information sent by the secondary base station, wherein the uplink resource configuration information includes a second field carrying an uplink resource configured by the secondary base station for the user equipment, wherein the uplink resource configuration information further includes a sounding reference signal or a channel quality indicator; and
sending, by the primary base station, the uplink resource configuration information to the user equipment.

2. The method according to claim 1, wherein the first message further comprises at least one of the following information:
an identifier of the user equipment, and a cell identifier of the secondary base station which is requested by the user equipment to be a reconfigured resource.

3. The method according to claim 2, wherein the reason for requesting reconfiguration indicates at least one of the following information:
the TAT times out, a scheduling request (SR) fails, the secondary base station has no physical uplink control channel (PUCCH) resource for sending an SR, the user equipment needs to send uplink data to the secondary base station, and the secondary base station needs to send downlink data to the user equipment.

4. The method according to claim 1, wherein the first message includes the uplink resource configuration information.

5. A resource reconfiguration method, comprising:
determining, by a secondary base station in response to detecting that a timing advance timer (TAT) maintained by a user equipment corresponding to the secondary base station times out, that a resource corresponding to the secondary base station needs to be reconfigured for the user equipment;
sending, by the secondary base station to a primary base station, uplink resource configuration information that is configured for the user equipment and that corresponds to the secondary base station, wherein the uplink resource configuration information includes a second field carrying an uplink resource configured by the secondary base station for the user equipment, wherein the uplink resource configuration information further includes a sounding reference signal or a channel quality indicator; and
sending, by the secondary base station, a first message to the primary base station for requesting the primary base station to send the uplink resource configuration information to the user equipment, wherein the user equipment simultaneously communicates with the primary base station and the secondary base station, wherein the first message comprises a first field carrying a reason for requesting reconfiguration.

6. The method according to claim 5, wherein the first message further comprises at least one of the following information:
an identifier of the user equipment, and a cell identifier of the secondary base station which is requested by the user equipment to be a reconfigured resource.

7. The method according to claim 6, wherein the reason for requesting reconfiguration indicates at least one of the following information:
the TAT times out, a scheduling request (SR) fails, the secondary base station has no physical uplink control channel (PUCCH) resource for sending an SR, the user equipment needs to send uplink data to the secondary base station, and the secondary base station needs to send downlink data to the user equipment.

8. The method according to claim 5, wherein the first message includes the uplink resource configuration information.

9. A base station for use as a primary base station, the base station comprising:
a transceiver, configured to receive and transmit a signal; and
a processor coupled to the transceiver and configured to:
control the transceiver to receive a first message sent by a secondary base station after the secondary base station detects that a timing advance timer (TAT) maintained by a user equipment corresponding to the secondary base station times out, wherein the first message is for requesting to reconfigure, for the user equipment, a resource corresponding to the secondary base station, wherein the user equipment simultaneously communicates with the primary base station and the secondary base station, wherein the first message comprises a first field carrying a reason for requesting reconfiguration;
control the transceiver to receive uplink resource configuration information sent by the secondary base station, wherein the uplink resource configuration information includes a second field carrying an uplink resource configured by the secondary base station for the user equipment, wherein the uplink resource configuration information further includes a sounding reference signal or a channel quality indicator, and
control the transceiver to send the uplink resource configuration information to the user equipment.

10. The base station according to claim 9, wherein the first message further comprises at least one of the following information:
an identifier of the user equipment, and a cell identifier of the secondary base station which is requested by the user equipment to be a reconfigured resource.

11. The base station according to claim 10, wherein the reason for requesting reconfiguration indicates at least one of the following information:
the TAT times out, a scheduling request (SR) fails, the secondary base station has no physical uplink control channel (PUCCH) resource for sending an SR, the user equipment needs to send uplink data to the secondary base station, and the secondary base station needs to send downlink data to the user equipment.

12. The base station according to claim 9, wherein the first message includes the uplink resource configuration information.

13. A base station for use as a secondary base station, the base station comprising:
a transceiver, configured to receive and transmit a signal; and
a processor coupled to the transceiver and configured to:
determine, in response to detecting that a timing advance timer (TAT) maintained by a user equipment corresponding to the secondary base station times out, that a resource corresponding to the secondary base station needs to be reconfigured for the user equipment,
control the processor to send, to a primary base station, uplink resource configuration information that is configured for the user equipment and that corresponds to the secondary base station, wherein the uplink resource configuration information includes a second field carrying an uplink resource configured by the secondary base station for the user equipment, wherein the uplink resource configuration information further includes a sounding reference signal or a channel quality indicator, and
control the transceiver to send a first message to the primary base station, wherein the first message for requesting the primary base station to send the uplink resource configuration information to the user equipment, wherein the user equipment simultaneously communicates with the primary base station and the secondary base station, wherein the first message comprises a first field carrying a reason for requesting reconfiguration.

14. The base station according to claim 13, wherein the first message further comprises at least one of the following information:
an identifier of the user equipment, and a cell identifier of the secondary base station which is requested by the user equipment to be a reconfigured resource.

15. The base station according to claim 14, wherein the reason for requesting reconfiguration indicates at least one of the following information:

the TAT times out, a scheduling request (SR) fails, the secondary base station has no physical uplink control channel (PUCCH) resource for sending an SR, the user equipment needs to send uplink data to the secondary base station, and the secondary base station needs to send downlink data to the user equipment.

16. The base station according to claim 13, wherein the first message includes the uplink resource configuration information.

* * * * *